United States Patent [19]
Latvala

[11] Patent Number: 5,118,165
[45] Date of Patent: Jun. 2, 1992

[54] ELECTRO-PNEUMATIC SPRING AND SERVICE BRAKE ACTUATOR

[75] Inventor: Bruce E. Latvala, Grafton, Ohio
[73] Assignee: Allied-Signal Inc., Morristown, N.J.
[21] Appl. No.: 647,316
[22] Filed: Jan. 29, 1991
[51] Int. Cl.$^5$ .............................................. B60T 13/22
[52] U.S. Cl. .................................... 303/9.76; 303/71; 188/170
[58] Field of Search .................... 188/170; 303/3, 6.01, 303/9, 9.76, 15, 63, 71; 92/63, 80

[56] References Cited

U.S. PATENT DOCUMENTS

| | | | |
|---|---|---|---|
| 3,302,530 | 2/1967 | Dobrikin et al. | 91/440 |
| 3,581,627 | 6/1971 | Campaini | 92/63 |
| 3,712,181 | 1/1973 | Swander, Jr. et al. | 188/170 X |
| 3,796,138 | 3/1974 | Doyle et al. | 188/170 X |
| 3,813,994 | 6/1974 | Swander, Jr. et al. | 92/63 X |
| 3,947,072 | 3/1976 | Plantan | 303/13 |
| 4,003,606 | 1/1977 | Plantan | 303/9 |
| 4,018,485 | 4/1977 | Fannin | 303/13 |
| 4,697,852 | 10/1987 | Scholz | 303/71 X |
| 5,024,490 | 6/1991 | Wang | 303/9 |

FOREIGN PATENT DOCUMENTS 3942993 7/1990 Fed. Rep. of Germany ........ 303/63

Primary Examiner—George E. A. Halvosa
Assistant Examiner—Alfred Muratori
Attorney, Agent, or Firm—Ken C. Decker; William N. Antonis

[57] ABSTRACT

An electro-pneumatic braking system includes a tandem brake actuator including a service brake actuating section and an emergency/parking spring actuated section. Hold-off pressure is communicated to the emergency/parking section through a three-way solenoid valve from a pressure reservoir, and communication to the service actuator is controlled by an electro-pneumatic modulator. Service pressure is taken both from the branch of the conduit communicating with the air reservoir, and from the hold-off pressure in the emergency/parking reservoir. Accordingly, only a single line communicates fluid pressure from the reservoir to the brake, and service brake response time is improved because the hold-off pressure and the emergency/parking section of the actuator is used as a small reservoir immediately adjacent the service actuator.

11 Claims, 1 Drawing Sheet

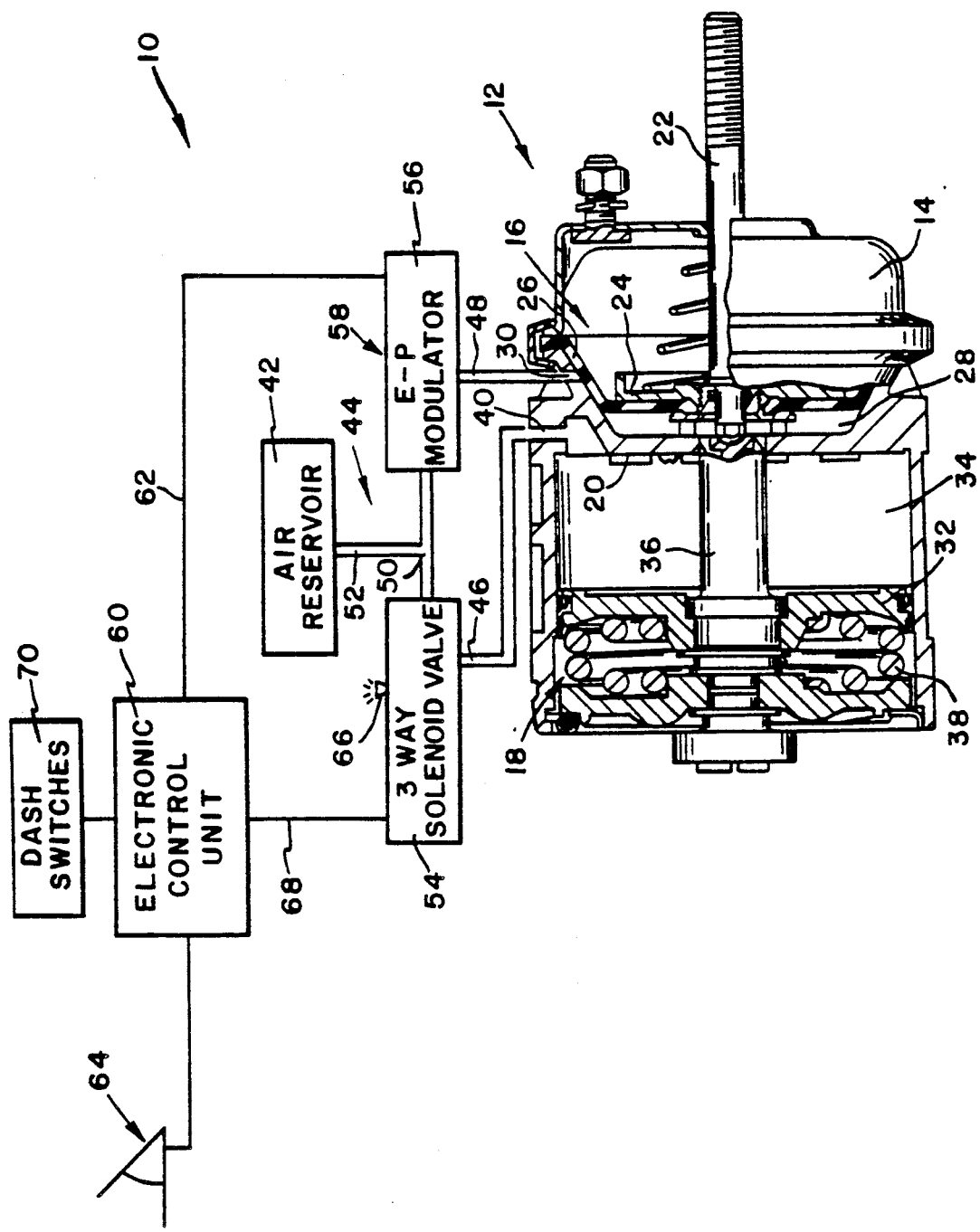

ELECTRO-PNEUMATIC SPRING AND SERVICE BRAKE ACTUATOR

This invention relates to a tandem spring and service brake actuator for an electro-pneumatic braking system.

BACKGROUND OF THE INVENTION

Conventional pneumatic braking systems for heavy duty vehicles use tandem brake actuators to effect actuation of the vehicle foundation brake. These tandem brake actuators include a service brake actuator, which is responsive to fluid pressure to effect a service brake application, and also include a spring brake actuator to effect an emergency and/or parking brake application. The spring actuator includes a heavy duty spring which yieldably urges the actuator rod in a brake application effecting direction. The spring is opposed by pneumatic "hold off" pressure during normal operation of the vehicle to permit a service brake application to be effected in the normal way. However, the hold-off pressure is vented during emergency conditions or when the vehicle is parked, to permit the spring to effect an emergency or parking brake application. Both the service braking pressure and the hold-off braking pressure are controlled by pneumatic signals generated by the vehicle operator. In such conventional systems, both the service brake pressure and the hold-off pressure are routed to the tandem actuator through separate brake lines. More recently, it has been proposed to replace the conventional pneumatic braking control system with an electro-pneumatic system in which electrical signals are generated by the vehicle operator to effect control of both the vehicle service and parking/emergency braking systems. Such a system is disclosed in U.S. Pat. No. 4,749,238.

SUMMARY OF THE INVENTION

The present invention minimizes the pneumatic lines and fittings used in an electro-pneumatic braking system to thereby minimize cost and eliminate leakage points by combining various functions. The present invention also improves braking performance by reducing the time delay inherent in communicating braking pressure to the vehicle service brake because an important feature of the invention is that the hold-off pressure used to hold off the spring brake is used to supplement the pressure communicated from the reservoir to the service brake when a service brake application is effected. Accordingly, only one pneumatic line need be routed to each actuator, and this line may be smaller than would otherwise be necessary because the spring hold-off pressure is used to assist in effecting a service brake application. The amount of hold-off pressure used during a normal brake application, which usually is a relatively low pressure application, will not normally decrease the hold-off pressure below that required to prevent the spring from cycling. Accordingly, the impact on spring life is minimal. If desired, during high-force applications, service brake actuation time can be further reduced by allowing the spring to supplement the service actuator during the initial application to momentarily compound the load from the two actuators. This would also decrease the required capacity of the supply line from the reservoir.

BRIEF DESCRIPTION OF THE DRAWING

These and other advantages of the present invention will become apparent from the following description, with reference to the accompanying drawing, the sole FIGURE of which is a schematic illustration of a braking system made pursuant to the teachings of the present invention.

DETAILED DESCRIPTION

Referring now to the drawing, an electropneumatic brake actuation system generally indicated by the numeral 10 includes a tandem actuator generally indicated by the numeral 12. The actuator 12 includes a housing 14 which is divided by a dividing wall 20 into a service actuating section 16 and a parking/emergency spring actuating section generally indicated by the numeral 18. The service actuator section 16 includes an actuating rod 22 which extends out of the housing 14 and which is connected to a conventional vehicle service brake (not shown) in a manner well known to those skilled in the art. The rod 22 extends from a pressure plate 24 which is connected to the wall of the housing 14 by a diaphragm 26 to thereby form a fluid pressure receiving compartment 28 between the diaphragm 26 and the wall 20. An inlet opening 30 is provided for communicating fluid pressure into the compartment 28.

The spring actuating section 18 includes a pressure responsive member 32 which cooperates with the wall of the housing 14 and the wall 20 to define a pressure chamber 34. The pressure responsive member 32 includes a stem 36 which extends through an opening in the wall 20 to engage the pressure plate 24. The pressure responsive member 32 is yieldably urged to the right, viewing the Figure, by a heavy actuation spring 38. Accordingly, when the pressure chamber 34 is vented, the spring 38 urges the pressure responsive member 32 and the actuating rod 22 to the right, viewing the Figure, thereby effecting an emergency/parking brake application. However, when hold-off pressure is communicated into the pressure chamber 34, the pressure responsive member 32 is urged to the position illustrated, thereby compressing the spring 38. An inlet 40 communicates hold-off pressure into the pressure chamber 34.

Fluid pressure is communicated to the ports 30 and 40 from a source of fluid pressure, such as a compressed air reservoir 42, by a conduit generally indicated by the numeral 44. Conduit 44 includes a first branch 46 which communicates with the inlet port 40, a second branch 48 which communicates with compartment 28 and with the first branch 46 through three-way junction 50, and a third branch 52 which communicates the junction 50 to the air reservoir 42. A three-way solenoid valve 54 controls communication through the branch 46, and an electro-pneumatic modulator 56 controls communication through the branch 48. Although illustrated separate from the tandem action 12 for clarity, it is within the scope of the invention to mount a solenoid valve 54 and the electro-pneumatic modulator 56 directly upon the housing 14, so that the branches 46 and 48 may be made extremely short. Accordingly, fluid pressure is communicated from the reservoir 42 through the third branch 52 alone, instead of the two separate air lines required in prior art actuators.

The electro-pneumatic modulator 56 may be of the proportional type, such as that disclosed in U.S. patent application No. 599,761, filed Oct. 18, 1990, or by a relay valve having separate electrically operated solenoids which respectively control communications between the modulator and exhaust opening 58 and between the modulator and second branch 48. Such a modulator is the same general type shown in U.S. Pat. No. 3,747,992. In either case, the modulator 56 responds to electrical signals generated by an electronic control unit 60 and transmitted to the modulator over lead 62 to establish a pressure level in compartment 28 that is a direct function of, and proportional to, the signals generated by a foot operated brake treadle generally indicated by numeral 64. The treadle 64 is operated by the vehicle operator, and generates an electrical signal which varies in accordance with the magnitude of braking demanded by the vehicle operator. This signal is transmitted to the electronic controller 60, which processes the signal and generates the signals which actuate the electro-pneumatic modulator 56.

Three-way solenoid valve 54 is conventional, and in its normal or deenergized state closes off communication between the junction 50 and inlet 40 and vents inlet 40 to atmosphere through atmospheric vent 66. When the solenoid valve 54 is energized, the vent 66 is closed, and communication is permitted from the junction 50 to the inlet port 40, thereby supplying hold-off pressure into the pressure chamber 34. Three-way solenoid valve 54 is also controlled by the electronic control unit 60 through electrical signals transmitted thereto through lead 68. The electric control unit 60 is caused to generate signals actuating three-way solenoid valve 54 by dash switches 70 which are operated by the vehicle operator. The dash switches 70, are more completely disclosed in U.S. Pat. No. 4,763,959.

MODE OF OPERATION

In operation, when the vehicle is to be moved, the dash switches 70 are operated, causing the electronic control unit 60 to energize three-way solenoid valve 54 to communicate fluid pressure from reservoir 42 into the pressure chamber 34. Pressure in chamber 34 overcomes the force of the spring 38, compressing the latter into the position illustrated in the drawing, thus releasing the emergency/parking brake application effected by the spring 38 to permit the vehicle to be moved. During vehicle operation, a service brake actuation is effected by operation of the treadle 64. This causes the electro-pneumatic modulator 56 to establish a pressure level in compartment 28 which is a function of the degree which the treadle 64 has been depressed. Accordingly, the actuating rod 22 and pressure plate 24 are urged to the right, viewing the Figure, while the pressure responsive member 32 remains in the released position illustrated in the drawing due to the maintenance of hold-off pressure in chamber 34.

Upon the operation of modulator 56 to communicate fluid pressure into the compartment 28, fluid pressure is taken from the common junction 50 between the third branch 52 of conduit 44 communicating with the reservoir 42 and from the first branch 46 of conduit 44 communicating with pressure chamber 34, because the three-way solenoid valve has been opened to permit movement of the vehicle. Accordingly, the line or branch 52 may be made smaller than would otherwise be necessary, because the pressure chamber 34 acts as a relatively small reservoir immediately adjacent the service actuator 16. Normal service actuations are of relatively low pressure, so that the pressure level in pressure chamber 34 is maintained at a sufficiently high level to maintain compression of spring 38. Accordingly, the spring 38 will not be cycled during normal service actuations of the actuator 12, so that life of the spring 38 will not be affected. However, in case of a high pressure emergency service actuation, it is within the scope of the invention that the electronic control unit 60, when a service brake of relatively high pressure is demanded, causes deactuation of the solenoid valve 54, so that the pressure level in pressure chamber 34 is also depleted by venting to the atmosphere, causing the spring 38 to make a momentarily compounded brake application to supplement the actuation generated by the pressure level in compartment 28. Accordingly, the size of the conduit branch 52 can even be further reduced from that would be otherwise necessary.

I claim:

1. Fluid pressure braking system comprising a fluid pressure source and a tandem brake actuator including a housing having a service actuating section and a spring actuating section, said service actuating section including fluid pressure responsive means for effecting a service brake application, said spring actuating section including a pressure responsive member cooperating with said housing to define a pressure chamber and a spring actuator acting through the pressure responsive member for effecting a spring brake application, said pressure responsive member being responsive to fluid pressure in said pressure chamber above a predetermined level to disable said spring actuator to thereby effect spring brake release, said pressure responsive member being responsive to fluid pressure in the pressure chamber below a predetermined level to permit said spring actuator to effect a spring brake application, and means for transferring fluid pressure from said pressure chamber to said fluid pressure responsive means when a service brake application is effected to operate said fluid pressure responsive means to effect a service brake application.

2. A fluid pressure braking system as claimed in claim 1, wherein conduit means communicate said pressure source with said tandem brake actuator, said means for transferring including a first branch of said conduit means communicating with the pressure chamber and a second branch of said conduit means communicating with the fluid pressure responsive means and with said first branch whereby fluid pressure is transferred from said pressure chamber to said fluid pressure responsive means through said first and second branches during a service brake actuation.

3. A fluid pressure braking system as claimed in claim 2, wherein the first branch includes operator actuated valve means shiftable from a first condition venting said pressure chamber and closing off communication through said first branch to said pressure source to thereby effect a spring brake actuation to a second condition communicating the pressure chamber with the pressure source to effect spring brake release.

4. A fluid pressure braking system as claimed in claim 3, wherein said second branch includes a valve mechanism controlling communication through said second branch to said pressure responsive means to thereby effect a service brake application.

5. A fluid pressure braking system as claimed in claim 4, wherein both said valve means and said valve mechanism are electrically actuated.

6. A fluid pressure braking system as claimed in claim 4, wherein said conduit means includes a third branch communicating both of said first and second branches to said pressure source, said second branch communicating said pressure responsive means with both said pressure source through said second and third branches and with said pressure chamber through said second and first branches when a service brake actuation is effected.

7. A fluid pressure braking system as claimed in claim 2, wherein said conduit means includes a third branch communicating both of said first and second branches to said pressure source, said second branch communicating said pressure responsive means with both said pressure source through said second and third branches and with said pressure chamber through said second and first branches when a service brake actuation is effected.

8. A fluid pressure braking system comprising a fluid pressure source and a tandem brake actuator including a housing having a service actuating section and a spring actuating section, said service actuating section including fluid pressure responsive means for effecting a service brake application, said spring actuating section including a pressure responsive member cooperating with said housing to define a pressure chamber and a spring actuator acting through the pressure responsive member for effecting a spring brake application, said pressure responsive member being responsive to fluid pressure in said pressure chamber above a predetermined level to disable said spring actuator to thereby effect spring brake release, said pressure responsive member being responsive to fluid pressure in the pressure chamber below a predetermined level to permit said spring actuator to effect a spring brake application, and conduit means communicating said pressure source with said tandem brake actuator, said conduit means including a first branch communicating with the pressure chamber and a second branch communicating with the fluid pressure responsive means and with said first branch, said conduit means including a third branch communicating both of said first and second branches to said pressure source, said second branch communicating said pressure responsive means with both said pressure source through said second and third branches and with said pressure chamber through said second and first branches when a service brake actuation is effected.

9. A fluid pressure braking system as claimed in claim 8, wherein the first branch includes operator actuated valve means shiftable from a first condition venting said pressure chamber and closing off communication through said first branch to said pressure source to thereby effect a spring brake actuation to a second condition communicating the pressure chamber with the pressure source to effect spring brake release.

10. A fluid pressure braking system as claimed in claim 9, wherein said second branch includes a valve mechanism controlling communication through said second branch to said pressure responsive means to thereby effect a service brake application.

11. A fluid pressure braking system as claimed in claim 10, wherein both said valve means and said valve mechanism are electrically actuated.

* * * * *